US012397332B2

United States Patent
Zhou et al.

(10) Patent No.: US 12,397,332 B2
(45) Date of Patent: Aug. 26, 2025

(54) PROCESSES FOR REDUCING ENVIRONMENTAL AVAILABILITY OF ENVIRONMENTAL POLLUTANTS

(71) Applicant: Albemarle Amendments, LLC, Charlotte, NC (US)

(72) Inventors: Qunhui Zhou, Concord, CA (US); Se H. Kim, Baton Rouge, LA (US); Jon E. Miller, Baton Rouge, LA (US); Sascha J. Welz, Phoenix, AZ (US); Zhongxin Ge, Baton Rouge, LA (US)

(73) Assignee: ALBEMARLE AMENDMENTS, LLC, Charlotte, NC (US)

( * ) Notice: Subject to any disclaimer, the term of this patent is extended or adjusted under 35 U.S.C. 154(b) by 634 days.

(21) Appl. No.: 17/637,577

(22) PCT Filed: Sep. 16, 2020

(86) PCT No.: PCT/US2020/051002
§ 371 (c)(1),
(2) Date: Feb. 23, 2022

(87) PCT Pub. No.: WO2021/055423
PCT Pub. Date: Mar. 25, 2021

(65) Prior Publication Data
US 2022/0274145 A1    Sep. 1, 2022

Related U.S. Application Data

(60) Provisional application No. 62/900,861, filed on Sep. 16, 2019.

(51) Int. Cl.
B09B 3/70    (2022.01)
B01J 20/20    (2006.01)

(52) U.S. Cl.
CPC ............... *B09B 3/70* (2022.01); *B01J 20/20* (2013.01)

(58) Field of Classification Search
CPC .. B09B 3/70; B01J 20/20; B01J 20/027; B01J 20/0266
See application file for complete search history.

(56) References Cited

U.S. PATENT DOCUMENTS

| | | |
|---|---|---|
| 6,953,494 B2 | 10/2005 | Nelson, Jr. |
| 8,404,038 B2 | 3/2013 | Andreth et al. |
| 8,420,033 B2 | 4/2013 | Zhang et al. |
| 9,101,907 B2 | 8/2015 | Nalepa et al. |

(Continued)

FOREIGN PATENT DOCUMENTS

| | | |
|---|---|---|
| CN | 103771556 A | 5/2014 |
| CN | 106281332 A | 1/2017 |

(Continued)

OTHER PUBLICATIONS

Japanese Office Action for JP Application No. 2022-517159, dated May 22, 2024, 17 pages.

(Continued)

*Primary Examiner* — Anthony J Zimmer
*Assistant Examiner* — Eric Scott Sherman
(74) *Attorney, Agent, or Firm* — KDW Firm PLLC (57) ABSTRACT

This invention provides processes for reducing the environmental availability of one or more environmental pollutants in solids, liquids, and combinations of solids and liquids.

14 Claims, 1 Drawing Sheet

(56) References Cited

U.S. PATENT DOCUMENTS

| | | |
|---|---|---|
| 2002/0198097 A1 | 12/2002 | El-Shoubary et al. |
| 2006/0057044 A1 | 3/2006 | Chang et al. |
| 2006/0247484 A1 | 11/2006 | Matthews |
| 2009/0136401 A1 | 5/2009 | Yang |
| 2011/0000855 A1 | 1/2011 | Kuhel et al. |
| 2011/0076210 A1* | 3/2011 | Pollack .............. B01J 20/28004 95/134 |
| 2012/0103907 A1 | 5/2012 | MacKinnon et al. |
| 2013/0272936 A1 | 10/2013 | Nalepa et al. |
| 2013/0330257 A1 | 12/2013 | Tramposch |
| 2016/0296908 A1 | 10/2016 | Li et al. |
| 2018/0319677 A1 | 11/2018 | Perreault et al. |

FOREIGN PATENT DOCUMENTS

| | | | | |
|---|---|---|---|---|
| JP | S49-031145 A | | 3/1974 | |
| JP | S58-049490 A | | 3/1983 | |
| JP | H105720 | * | 1/1998 | ............... A62D 3/30 |
| JP | H105720 A | | 1/1998 | |
| JP | H10202003 A | | 8/1998 | |
| JP | 2948879 | * | 9/1999 | ............ C08G 73/02 |
| JP | 2005177709 A | | 7/2005 | |
| JP | 2012025934 | * | 2/2012 | ............... A62D 3/30 |
| JP | 2019116670 A | | 7/2019 | |
| RU | 2485056 C1 | | 6/2013 | |
| RU | 2485066 C1 | | 6/2013 | |
| RU | 2531303 C2 | | 10/2014 | |
| RU | 2664523 C2 | | 8/2018 | |
| SU | 1581700 A1 | | 7/1990 | |
| WO | 8808748 A1 | | 11/1988 | |
| WO | 03006140 A1 | | 1/2003 | |
| WO | 2011038415 A2 | | 3/2011 | |
| WO | 2012030560 A1 | | 3/2012 | |
| WO | 2012071206 A1 | | 5/2012 | |
| WO | 2014164980 A1 | | 10/2014 | |
| WO | 2019012278 A1 | | 1/2019 | |
| WO | 2019131977 A1 | | 7/2019 | |
| WO | 2019213615 A1 | | 11/2019 | |

OTHER PUBLICATIONS

Russian Office Action in RU application No. 2022108118/10(016887), dated Aug. 23, 2024, 10 pages.

Asasian, N. et al.; "Sulfurized Activated Carbons and Their Mercury Adsorption/Desorption Behavior in Aqueous Phase"; Int. J. Environ. Sci. Technol., 2015, 12, pp. 2511-2522.

Liu, W. et al., "Optimization of Sulfur Impregnation Protocol for Fixed-Bed Application of Activated Carbon-Based Sorbents for Gas-Phase Mercury Removal"; Environ. Sci. Technol., 1998, 32, pp. 531-538.

Sano, A. et al., "Vapor-phase Elemental Mercury Adsorption by Activated Carbon Co-impregnated with Sulfur and Chlorine"; Chem. Engineering J., 2017, 315, pp. 598-607.

Russian Search Report for Application No. 2022108118 dated Mar. 5, 2024.

Japanese Office Action for JP Application No. 2022-517159, dated Dec. 4, 2024, 11 pages.

* cited by examiner

PROCESSES FOR REDUCING ENVIRONMENTAL AVAILABILITY OF ENVIRONMENTAL POLLUTANTS

REFERENCE TO RELATED APPLICATIONS

This application is the National Stage of International Patent Application No. PCT/US2020/051002, filed on Sep. 16, 2020, which application claims priority from U.S. Provisional Patent Application No. 62/900,861, filed Sep. 16, 2019, the disclosures of which are incorporated herein by reference.

TECHNICAL FIELD

This invention relates to remediation of environmental pollutants to reduce their environmental availability.

BACKGROUND

Many pollutants are known to be toxic to humans and to the environment. One of these known environmental pollutants, mercury, has been categorized as a priority hazardous substance by the Agency for Toxic Substances and Disease Registry (ATSDR) of the U.S. Health and Human Services Department. The U.S. National Priorities List (NPL), maintained by the U.S. Environmental Protection Agency (EPA), has listed numerous sites that were contaminated by mercury, such sites comprising various pollutant-containing substances, including solids (e.g., soil, debris, waste), liquids (e.g., groundwater, lakes, ponds), and combinations of solids and liquids (e.g., sludge, slurries, sediments). The majority of these sites have not been de-contaminated to remove mercury. Unacceptable levels of mercury or mercury compounds may also be present in sites not listed in the U.S. NPL. Environmental pollutants other than mercury raise similar concerns.

Mercury contamination can come from a variety of different sources such as mining and ore processes, chlor-alkali plants, and battery manufacturing processes. There also are many landfills contaminated with mercury-containing waste. Additionally, mercury pollutants are present in multiple forms including metallic mercury, organic mercury compounds, and inorganic mercury compounds, often at the same site. Different mercury forms and/or different substances often require different treating methods.

Mercury contaminated substances are likely to also comprise multiple other environmental pollutants. For example, some substances are also contaminated with organics and/or other heavy metals, and these other environmental pollutants provide similar challenges. Therefore, reducing the environmental availability of environmental pollutants at any particular site can be technically challenging and costly, depending on the substance that is contaminated, condition of the substance, waste types, mercury forms, and other contaminants or environmental pollutants present. Reducing the environmental availability of environmental pollutants, which in turn reduces the bio-availability of pollutants and thus their bio-accumulation, especially in substances such as soils, groundwaters, sediments, and slurries, is of particular interest.

Current commercial remediation processes applied to soils and other solids include stabilization/solidification, washing, thermal desorption, and vitrification. Processes applied to water and other liquids include precipitation/co-precipitation, adsorption, filtration, and bioremediation. Processes applied to sediments and other combinations of solids and liquids include in situ capping, dredging/excavation, a combination of these approaches, as well as Monitored Natural Recovery (MNR) and enhanced Monitored Natural Recovery (EMNR). Monitored natural recovery relies on natural processes to protect the environment and receptors from unacceptable exposures to contaminants, while enhanced MNR applies material or amendments to enhance natural recovery processes (such as the addition of a thin-layer cap or a reactive amendment such as carbon). These remediation technologies all provide benefits in controlling environmental impacts from environmental pollutants, including human health and ecological risks, but these remediation technologies also have limitations.

Another factor to be considered for some remediation technologies is the tendency for an environmental pollutant to migrate from (or leach out of) its location after it has been sequestered or stabilized. The U.S. EPA regulates this as well, and has a Toxicity Characteristic Leaching Procedure (TCLP), a test designed to determine the mobility of both organic and inorganic analytes present in liquid, solid, and multiphasic wastes.

Complicated bench- and pilot-scale research and screening tests have to be conducted to evaluate a technology to determine if it is suitable before it is selected to remediate an actual contaminated site. In addition, the variability with each site to be treated makes the remediation of mercury and other environmental pollutants contamination quite expensive and time-consuming. Thus, there is a need for new and more commercially attractive processes for reducing environmental availability and bio-availability of environmental pollutants in solids and liquids, as well as in combinations thereof.

SUMMARY OF THE INVENTION

This invention provides processes for reducing environmental availability of at least a portion of one or more environmental pollutants in a substance comprising one or more environmental pollutants. A benefit provided by the processes of this invention is a reduction of environmental availability of toxic environmental pollutants in substances. Such toxic pollutants include mercury and methyl mercury, as well as heavy metals and ecologically toxic organic matter.

An advantage provided by the processes of this invention is that by reducing environmental availability of environmental pollutants in substances, bio-availability and bio-accumulation of such pollutants is also reduced. When the environmental pollutant is mercury, another advantage is that the processes of the invention do not need sulfide to be present, and so reduction of environmental availability and thus reduction of bio-availability is not negatively affected by acidic conditions which permit sulfides to form sulfuric acid or sulfate compounds; this absence of sulfates in turn minimizes mercury methylation.

Processes of this invention can be used as the sole process for reducing the environmental availability and/or the presence of environmental pollutants, such as mercury, in a substance, or can be used to complement and/or enhance the reduction in environmental availability and/or the amount of such environmental pollutants in the substance than is attained by existing technologies.

An embodiment of this invention is a process for reducing environmental availability of at least a portion of one or more environmental pollutants in a substance comprising one or more environmental pollutants. This process comprises a) adding and/or applying an inorganic halide compound or an inorganic sulfide compound to the substance and b) adding and/or applying a sorbent to the substance. The inorganic halide compound comprises one or more inorganic fluorides, inorganic chlorides, inorganic bromides, and/or inorganic iodides. Adding and/or applying the inorganic halide compound or inorganic sulfide compound and the sorbent to the pollutant-containing substance reduces the environmental availability of at least a portion of one or more environmental pollutants in the substance.

These and other embodiments and features of this invention will be further apparent from the ensuing description and appended claims.

BRIEF DESCRIPTION OF THE DRAWINGS

The FIGURE illustrates embodiments of specific aspects of the invention, and are not intended to impose limitations on the scope of the invention.

FURTHER DETAILED DESCRIPTION OF THE INVENTION

Figure 1:
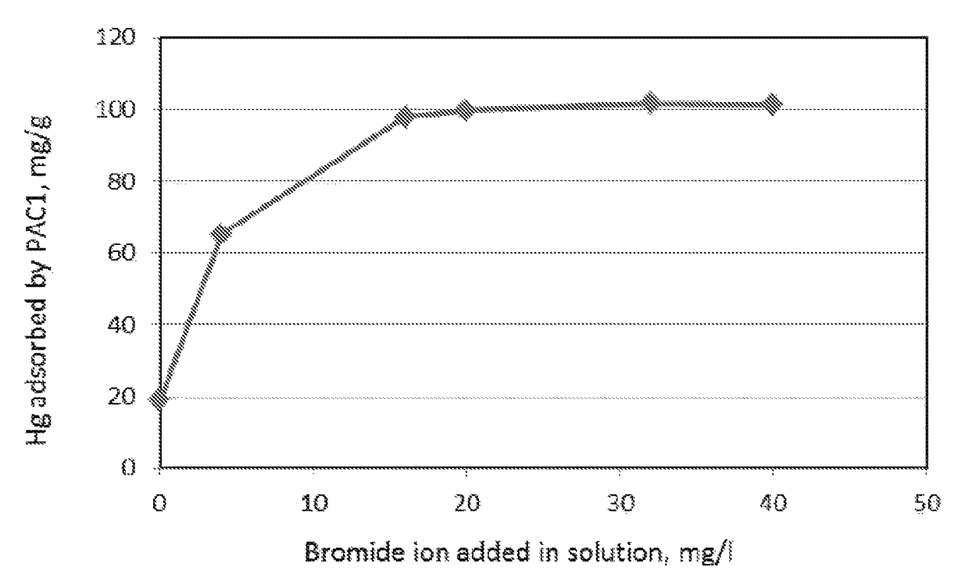
The FIGURE is a graph showing mercury adsorption as a function of bromide ion concentration from Example 1.

The present invention provides processes for reducing the environmental availability of environmental pollutants. As used throughout this document, the term "reducing environmental availability" refers to stabilizing, immobilizing, fixing, encapsulating, isolating, containing, destroying, detoxifying, decomposing, and decaying, reducing the amount of, reducing the mobility of, and/or reducing the migration ability of, at least one environmental pollutant. The stabilizing and/or immobilizing can be in a medium. Reducing the environmental availability of environmental pollutants in turn reduces the bio-availability of pollutants and thus their bio-accumulation.

As used herein, the terms "environmental pollutant" and "environmental pollutants" means a chemical element or compound or mixture thereof known to be harmful to humans and/or to impact the environment (ecosystem). Environmental pollutants are typically regulated by one or more government agencies. Examples of environmental pollutants include mercury in all of its forms, e.g., elemental mercury, organic mercury compounds, and inorganic mercury compounds; other organic matter (including, for example, without limitation, hydrophobic organic compounds, polycyclic aromatic hydrocarbons, polychlorinated biphenyls, dioxins, furans, and/or chlorinated pesticides); hazardous elements, organic and inorganic heavy metal compounds (including, for example, without limitation, compounds comprising As, Pb, Zn, Cu, Cr, and/or Cd); and other environmental pollutants known to those skilled in the art.

As used throughout this document, terms such as "treated", "contacted", and "remediated" indicate that the inorganic halide compound or inorganic sulfide compound and/or sorbent interact with the substance containing one or more environmental pollutants in a manner that results in the reduction of environmental availability of one or more environmental pollutants.

The phrase "inorganic halide" and the word "halide" are used throughout this document to refer to halide ions (fluoride, chloride, bromide, and iodide).

The remediation agents in the practice of this invention comprise an inorganic halide compound and a sorbent or an inorganic sulfide compound and a sorbent; in the embodiments in which the substance comprises bromide ions in addition to one or more environmental pollutants, the remediation agents are bromine-containing carbonaceous materials.

Sorbents include carbonaceous materials and inorganic materials. Suitable carbonaceous materials that can be used as sorbents in the practice of this invention include, for example, without limitation, activated carbon, carbon black, char, and coke. A preferred carbonaceous material is activated carbon, which can be used in many forms including, for example, without limitation, powdered, granular, or extruded; and high specific surface area.

Suitable inorganic materials that can be used as sorbents in the practice of this invention include inorganic oxides such as alumina (amorphous and crystalline), silica, magnesia and titania; natural zeolites, such as chabazite, clinoptilolite, and faujasite; synthetic zeolites, such as synthetic chabazite, zeolites with high Si:Al ratios (ZSM-5, beta zeolites, sodalite), zeolites with moderate Si:Al ratios (Y zeolites, A zeolites), silica alumina phosphate (SAPO) zeolites, ion exchanged zeolites, uncalcined zeolites, clay minerals such as kaolin, kaolinite, bentonite, and montmorillonite; synthetic clays such as laponite, saponite, sauconite, stevensite, kaolinite, and hectorite; organo-clays such as montmorillonite that has been treated with a trimethyl stearyl ammonium salt, a dimethyl dialkyl ($C_{14}$-$C_{18}$) ammonium salt, a methyl dihydroxyethyl ammonium salt and a hydrogenated tallow ammonium salt, and aminopropyltriethoxysilane and octadecylamine; bentonite, hectorite, and attapulgite that have been treated with a quaternary ammonium salt; and zeolites that have been treated with N,N,N-trimethyl-1-hexadecanaminium chloride; inorganic hydroxides such as iron hydroxide; mixed metal oxides such as hydrotalcites and metallated double layered clays; diatomaceous earth; cement dust; hydroprocessing catalysts including those on substrates such as alumina, silica, or titania; inorganic carbonates, such as alkali metal carbonates (e.g., sodium carbonate and potassium carbonate) and alkaline earth carbonates (e.g., calcium carbonate); and mixtures of any two or more of the foregoing. Preferred inorganic materials include inorganic oxides, especially silica, natural zeolites, especially chabazite, inorganic carbonates, especially calcium carbonate, and clay minerals, especially kaolinite and bentonite.

Another type of sorbent that can be used in the practice of this invention is a modified sorbent material, where "modified" indicates that a sorbent material has been contacted with a chemical to modify the sorbent material; the sorbent material may be a carbonaceous material or an inorganic material; preferences for carbonaceous materials and inorganic materials are as described above. Preferably, the modified sorbent material comprises a modified carbonaceous material. Modified sorbent materials are usually halogen-containing sorbents and sulfur-containing sorbents, preferably halogen-containing carbonaceous materials and sulfur-containing carbonaceous materials, more preferably halogen-containing carbonaceous materials, especially bromine-containing carbonaceous materials.

When the modified sorbent material is a halogen-containing sorbent, the halogen comprises one or more halogens selected from fluorine, chlorine, bromine, and/or iodine; bromine is a preferred halogen. The amount of halogen (or halogen content) on the sorbent material is typically equivalent to a total bromine content (or calculated as bromine) in the range of about 0.1 wt % to about 20 wt %, based on the total weight of the halogen-containing sorbent; here, the numerical value is calculated for bromine, even if the halogen is not bromine. Halogen-containing sorbents can be made from a sorbent material and one or more halogen-containing compounds as described in U.S. Pat. Nos. 6,953,494 and 9,101,907, and in International Patent Pub. No. WO 2012/071206.

When the modified sorbent material is a sulfur-containing sorbent, the amount of sulfur (or sulfur content) on the sorbent material is typically in the range of about 0.1 wt % to about 15 wt %, based on the total weight of the sulfur-containing sorbent. Sulfur-containing sorbents can be made from a sorbent material and one or more sulfur-containing compounds or elemental sulfur as described in International Patent Pub. No. WO 2012/071206, *Environ. Sci. Technol.* 1998, 32, 531-538 (Liu et al.), and hit. *J. Environ. Sci. Technol.*, 2015, 12, 2511-2522 (Asasian et al.).

The inorganic halide compound can be an inorganic fluoride, an inorganic chloride, an inorganic bromide, an inorganic iodide, or a mixture of any two or more halides. Inorganic chlorides and inorganic bromides are preferred inorganic halides; more preferred are inorganic bromides. The inorganic halides are provided by one or more inorganic halide compounds. Mixtures of inorganic halide compounds can be used; the mixtures may contain the same inorganic halide element and/or a different inorganic halide element. Types of inorganic halide compounds that can be used include hydrohalic acids, alkali metal halides, alkaline earth halides, other metal halide salts, and ammonium halides.

Hydrohalic acids include hydrogen chloride, hydrogen bromide, and hydrogen iodide.

Alkali metal halides include lithium halides, sodium halides, potassium halides, rubidium halides, and cesium halides; sodium halides and potassium halides are preferred. Suitable alkali metal halides include sodium fluoride, sodium chloride, sodium bromide, sodium iodide, potassium fluoride, potassium chloride, potassium bromide, and potassium iodide. Alkaline earth halides include magnesium halides, calcium halides, strontium halides, and barium halides; calcium halides are preferred. Suitable alkaline earth halides include magnesium fluoride, magnesium chloride, magnesium bromide, magnesium iodide, calcium fluoride, calcium chloride, calcium bromide, and calcium iodide. Other suitable metal halide salts include iron(III) fluoride, iron(III) chloride, iron(III) bromide, iron(III) iodide, manganese(II) fluoride, manganese(II) chloride, manganese(II) bromide, and manganese(II) iodide. Ammonium halides include ammonium chloride, ammonium bromide, and ammonium iodide.

Preferred inorganic halide compounds include hydrogen bromide, sodium chloride, sodium bromide, potassium bromide, potassium iodide, calcium bromide, iron(III) bromide, and manganese(II) bromide; more preferred are hydrogen bromide, sodium chloride, sodium bromide, potassium bromide, potassium iodide, and calcium bromide; even more preferred are sodium bromide and calcium bromide, especially sodium bromide.

The inorganic sulfide compound can be hydrogen sulfide, ammonium sulfide, an alkali metal sulfide, an alkaline earth sulfide, or another metal sulfide salt. Alkali metal sulfides include lithium sulfide, sodium sulfide, potassium sulfide, rubidium sulfide, and cesium sulfide; sodium sulfide and potassium sulfide are preferred. Alkaline earth sulfides include magnesium sulfide, calcium sulfide, strontium sulfide, and barium sulfide; calcium sulfide is preferred. Other suitable metal sulfide salts include iron(III) sulfide and manganese(II) sulfide.

Preferred inorganic sulfide compounds include hydrogen sulfide, sodium sulfide, potassium sulfide, and calcium sulfide; more preferred are hydrogen sulfide and sodium sulfide, especially sodium sulfide.

In some embodiments, the inorganic halide compound or inorganic sulfide compound is used as a solid; if small particles are needed or desired, the solid inorganic halide compound or inorganic sulfide compound can be reduced to the needed or desired particle size. In other embodiments, the inorganic halide compound or inorganic sulfide compound is used as a solution or slurry, normally and preferably as an aqueous solution.

In a solution, the inorganic halide compound or inorganic sulfide compound can be at a concentration up to its solubility limit in the solvent. The inorganic halide compound or inorganic sulfide compound in a solution or slurry is in an amount such that the halide or sulfide is about 0.5 wt % to about 45 wt % calculated as bromide relative to the total weight of the solution. Preferably, the inorganic halide compound or inorganic sulfide compound in a solution or slurry is in an amount such that the halide or sulfide is about 1 wt % to about 30 wt %, more preferably about 5 wt % to about 20 wt %, calculated as bromide relative to the total weight of the solution or slurry.

As used throughout this document, the phrases "as bromide," "reported as bromide," "calculated as bromide," and analogous phrases for the halides and sulfide refer to the amount of halide or sulfide, where the numerical value is calculated for bromide, unless otherwise noted. For example, an inorganic fluoride may be used, but the amount of halide relative to the weight of the solution or slurry is stated as the value for bromide.

The relative amounts of halide or sulfide and sorbent can vary widely, as needed for the particular substance needing remediation. Often, the amount of sorbent relative to the halide or sulfide is very low, e.g., about 100 ppm to about 1000 ppm (about 0.01 wt % to about 0.1 wt %).

Activated carbons suitable for use in processes of this invention can have a wide range of particle sizes and distributions, from nanometer to centimeter; and can be formed from activated carbon forms including, for example, without limitation, powdered, granular, or extruded; high specific surface area, a variety of unique pore structures, varying pore distributions; and other features as will be familiar to those skilled in the art.

These inorganic halide compounds and sorbents or inorganic sulfide compounds and sorbents, when used together, especially inorganic bromide compounds, more especially inorganic bromide compounds and activated carbons, can reduce environmental availability of pollutants in substances through means including, for example, without limitation, oxidation and/or adsorption. Adsorption can reduce the environmental availability of environmental pollutants by reducing mobility of such pollutants. Other ways in which inorganic halide compounds and sorbents or inorganic sulfide compounds and sorbents when used together can reduce environmental availability of pollutants are by enhancing the degradation of such pollutants through surface reactions; and/or by inhibiting the formation of pollutants such as methyl mercury; and/or by other mechanisms. In the processes of this invention, whether applied to solids, or liquids, or combinations thereof, the environmental pollutants contacted by the inorganic halide compounds or inorganic sulfide compounds and/or adsorbed by the sorbents are stabilized such that desorption into the environment is substantially minimized.

In the practice of this invention, the inorganic halide compound or inorganic sulfide compound and sorbent are not mixed or combined prior to application to the substance to be remediated. The phrase "used together" means that both the inorganic halide compound or inorganic sulfide compound and sorbent are used in the process. The inorganic halide compound or inorganic sulfide compound and the sorbent can be added or applied to the substance to be remediated at the same time or at different times, and at the same location or at different locations. When the inorganic halide compound or inorganic sulfide compound and the sorbent are added at different times, the periods of time for each may overlap, or there may not be overlap in the periods of time the inorganic halide compound or inorganic sulfide compound is added and/or applied and the sorbent is added and/or applied. The inorganic halide compound or inorganic sulfide compound and the sorbent can be added and/or applied to the substance to be treated via the same conduit or different conduits, or via the same mode of addition or via different modes of addition. For example, if the inorganic halide compound or inorganic sulfide compound and the sorbent are injected, they may be injected through separate injection ports, and the inorganic halide compound or inorganic sulfide compound and the sorbent may be injected at different points in time. Preferences for adding and/or applying the inorganic halide compound or inorganic sulfide compound and the sorbent depend on various factors, which include the substance being treated and the remediation method being used.

Mercury and other environmental pollutants can react with the inorganic halide compounds or inorganic sulfide compounds and/or become adsorbed onto or into sorbents, especially inorganic bromides and activated carbon when used together, effectively removing the pollutants. For example, bromide ion can chemically bond with ionic mercury.

Some inorganic halide compounds or inorganic sulfide compounds and sorbents, when used together, particularly inorganic bromide compounds and activated carbons, capture mercury, and may allow physical and/or chemical adsorption of mercury. Mercury that has been captured by a combination of activated carbon and one or more inorganic bromides is stable in a wide range of pH values, where "stable" means that the mercury is not released from the combination of activated carbon and one or more inorganic bromides in appreciable amounts after capture.

The inorganic halide compounds or inorganic sulfide compounds and sorbents used in processes of this invention can be combined with other optional components such as pH buffers (including, for example, without limitation, carbonates and phosphates); carriers (including, for example, without limitation, sand and mud); binders (including, for example, without limitation, mud, clay, and polymers); and/or other additives (including, for example, without limitation, iron compounds and sulfur compounds).

In the practice of this invention, the inorganic halide compound or inorganic sulfide compound and the sorbent can be used in various forms, including as a dry sorbent and a dry inorganic halide compound, or one or both of the inorganic halide compound or inorganic sulfide compound and the sorbent can be in a suitable fluid, for example, in a slurry. As used herein, the term "suitable fluid" means fluids such as water, and other fluids. Those skilled in the art, given the teachings of this disclosure, have at hand the knowledge to select a suitable fluid, as the selection depends upon variables such as the composition of the substance, the composition of the environmental pollutants present in the substance, and the like.

Some treatments of substances can be conducted both in-situ and ex-situ.

Thermal desorption and retorting are two common ex situ methods of thermal treatment for mercury remediation. The technology heats contaminated medium to volatilize mercury, followed by condensing vapors into liquid elemental mercury. An inorganic halide compound or inorganic sulfide compound and the sorbent, preferably an inorganic bromide and activated carbon, may be used to adsorb mercury as a replacement of the liquid mercury condenser or to remove mercury in off-gasses exiting the condenser.

In some applications, the inorganic halide compound or inorganic sulfide compound and/or the sorbent will remain in or with the substance. In other applications, the inorganic halide compound or inorganic sulfide compound and/or sorbent may be collected after use. When the collected after use, the sorbent can be disposed of, or regenerated and re-used.

The substances containing one or more environmental pollutants are solids, liquids, or combinations of a solid and a liquid, or combinations of one or more solids and one or more liquids. When the substance is a solid, it may comprise more than one solid. When the substance is a liquid, it may comprise more than one liquid.

In some processes of this invention, whether applied to a substance comprising one or more solids, one or more liquids, or combinations of at least one solid and at least one liquid, use of the inorganic halide compound or inorganic sulfide compound and sorbent can be a stand-alone remedial approach or can complement the use of other remediation methods. In other processes according to the invention, the inorganic halide compound or inorganic sulfide compound and sorbent can be used in addition to one or more other remediation agents in the same remediation procedure.

Adding an inorganic halide compound or inorganic sulfide compound and a sorbent into contaminated waste adsorbs one or more pollutants. In some embodiments, the inorganic halide compound or inorganic sulfide compound and the sorbent remain in the substance to stabilize and/or solidify the substance. In other embodiments, the combined inorganic halide compound or inorganic sulfide compound, sorbent, and substance are placed in landfill, often with a binder and other compounds.

As used herein, the term "solid" and/or "solids", include without limitation, soil, debris, waste and other such substances known to those skilled in the art. Soil is a preferred solid to treat in the practice of this invention. Processes of the invention are provided for reducing environmental availability of at least a portion of one or more environmental pollutants in a solid comprising one or more environmental pollutants. Substances which are solids are sometimes referred to herein as solid substances.

The adding and/or applying of an inorganic halide compound or inorganic sulfide compound and a sorbent to the solid can comprise:

(a) injecting an inorganic halide compound or inorganic sulfide compound and a sorbent into the solid, optionally through holes and/or wells and/or channels that are present in the substance, whether already present or manually created, e.g., by drilling into the substance; and/or (b) applying an inorganic halide compound or inorganic sulfide compound and a sorbent to a surface of the solid; and/or (c) combining an inorganic halide compound or inorganic sulfide compound and a sorbent with at least a portion of a surface of the solid; and/or (d) adding an inorganic halide compound or inorganic sulfide compound and a sorbent to a contained solid; and/or (e) combining an inorganic halide compound or inorganic sulfide compound and a sorbent with the solid; and/or (f) adding an inorganic halide compound or inorganic sulfide compound and a sorbent to a reactive barrier; and/or (g) forming a reactive barrier containing an inorganic halide compound or inorganic sulfide compound and a sorbent; and/or (h) placing an inorganic halide compound or inorganic sulfide compound and a sorbent in a vacuum well in which the solid is treated.

Some preferred methods for adding and/or applying an inorganic halide compound or inorganic sulfide compound and a sorbent to the solid are:

(a) injecting an inorganic halide compound or inorganic sulfide compound and a sorbent into the solid, optionally through holes and/or wells and/or channels that are present in the substance, whether already present or manually created, e.g., by drilling into the substance; and/or (b) applying an inorganic halide compound or inorganic sulfide compound and a sorbent to a surface of the solid; and/or (c) combining an inorganic halide compound or inorganic sulfide compound and a sorbent with at least a portion of a surface of the solid; and/or (d) adding an inorganic halide compound or inorganic sulfide compound and a sorbent to a contained solid; and/or (e) combining an inorganic halide compound or inorganic sulfide compound and a sorbent with the solid; and/or (f) adding an inorganic halide compound or inorganic sulfide compound and a sorbent to a reactive barrier; and/or (g) forming a reactive barrier containing an inorganic halide compound or inorganic sulfide compound and a sorbent.

More preferred methods for adding and/or applying an inorganic halide compound or inorganic sulfide compound and a sorbent to the solid are:

(a) injecting an inorganic halide compound or inorganic sulfide compound and a sorbent into the solid;

(b) applying an inorganic halide compound or inorganic sulfide compound and a sorbent to a surface of the solid; and/or (c) combining an inorganic halide compound or inorganic sulfide compound and a sorbent with at least a portion of a surface of the solid.

Combining an inorganic halide compound or inorganic sulfide compound and a sorbent with the surface of the solid as in (c) above can be done by combining the inorganic halide compound or inorganic sulfide compound and the sorbent with a portion of the solid, and then applying the mixture of the inorganic halide compound or inorganic sulfide compound, sorbent, and portion of the solid to the surface of the solid, or by combining the inorganic halide compound or inorganic sulfide compound and the sorbent with the surface of the solid.

An embodiment of treatment of solids to reduce environmental availability of one or more environmental pollutants involves (i) drilling holes, wells, and/or channels into the solid, (ii) covering a surface of the solid with a layer of inorganic halide compound or inorganic sulfide compound and sorbent, and (iii) heating some parts of the solid to migrate one or more environmental pollutants, e.g., mercury, toward the surface which has an inorganic halide compound or inorganic sulfide compound and a sorbent thereon.

Another embodiment of treatment of solids to reduce environmental availability of one or more environmental pollutants involves (i) drilling holes, wells, and/or channels into the solid, (ii) filling some holes or channels with an inorganic halide compound or inorganic sulfide compound and a sorbent, and (iii) purging heated air into holes or channels to migrate one or more environmental pollutants, e.g., mercury, toward the holes filled with the inorganic halide compound or inorganic sulfide compound and the sorbent.

In some embodiments of the invention, the solid is heated to vaporize the environmental pollutant, e.g., mercury, in a vacuum well; when an inorganic halide compound or inorganic sulfide compound and a sorbent are present in the vacuum well as in (h) above, the inorganic halide compound or inorganic sulfide compound and/or sorbent can absorb the vaporized environmental pollutant(s). In these procedures, the inorganic halide compound or inorganic sulfide compound is placed with the substance being treated and the sorbent is placed in contact with the vapor produced in the vacuum well at one or more locations before the vapor exits to atmosphere. One application of this procedure is for Soil Vapor Extraction (SVE) for mercury remediation, and inorganic halide compounds or inorganic sulfide compounds and sorbents, especially inorganic bromides and activated carbons, can be used in the vacuum well to adsorb mercury.

In a particular type of solid substance, soil, an inorganic halide compound or inorganic sulfide compound and a sorbent can be utilized to immobilize mercury prior to, or during stabilization and solidification (S/S) of soil in situ and/or ex situ treatment. One ex situ process adds an inorganic halide compound or inorganic sulfide compound and a sorbent, one or more binders, and other components into a contaminated substance and mixes them together in a reactor. The mixture is then stabilized and cemented or placed in landfill. In some embodiments, an inorganic bromide and powdered activated carbon can be used in S/S treatment processes. Mercury adsorbed by inorganic bromides and powdered activated carbon is stable during making and curing of concrete; see for example U.S. Pat. Nos. 8,404,038 and 8,420,033. This is advantageous because fly ash and cement are typical binders used in S/S technologies.

In another embodiment of this invention in which inorganic halide compounds or inorganic sulfide compound and sorbents, especially inorganic bromides and powdered activated carbons, are remediation agents for mercury contaminated soil, the inorganic halide compound or inorganic sulfide compound and sorbent are spread on top of the contaminated soil. In this method, the soil is not disturbed and the inorganic halide compound or inorganic sulfide compound and sorbent, especially an inorganic bromide and activated carbon, are present in the top layer of soil and block migration of mercury from the soil.

Either or both of the inorganic halide compound or inorganic sulfide compound and the sorbent, preferably inorganic bromide compounds and activated carbons, can be mixed with another agent to create a mixture that improves penetration of the inorganic halide compound or inorganic sulfide compound and/or the sorbent into the solid, especially soil. In some embodiments, a pH adjustment agent is also applied, either separately or in admixture with the inorganic halide compound or inorganic sulfide compound and/or the sorbent, optionally along with an agent that improves penetration of the inorganic halide compound or inorganic sulfide compound and/or the sorbent into the solid.

Processes of the invention are provided for reducing environmental availability of at least a portion of one or more environmental pollutants in a liquid comprising one or more environmental pollutants. As used herein, the term "liquid" and/or "liquids", include without limitation, groundwater, wastewater, surface water, salt water, fresh water (e.g., lakes, ponds), and other such substances known to those skilled in the art. Substances which are liquids are sometimes referred to herein as liquid substances.

The adding and/or applying of an inorganic halide compound or inorganic sulfide compound and a sorbent to the liquid can comprise:
- (a) injecting an inorganic halide compound or inorganic sulfide compound and a sorbent into the liquid; if desired, the used sorbent can be filtered; and/or
- (b) applying an inorganic halide compound or inorganic sulfide compound and a sorbent to the surface of the liquid; and/or
- (c) combining an inorganic halide compound or inorganic sulfide compound and a sorbent with the liquid; and/or
- (d) passing the liquid over a fixed bed comprising an inorganic halide compound or inorganic sulfide compound and a sorbent; and/or
- (e) passing the liquid through a filter comprising an inorganic halide compound or inorganic sulfide compound and a sorbent; and/or
- (f) adding an inorganic halide compound or inorganic sulfide compound and a sorbent to a contained volume of liquid; and/or
- (g) contacting the liquid and an inorganic halide compound or inorganic sulfide compound, and pumping the liquid through a fixed bed or column containing a sorbent during or after the contacting with the inorganic halide compound or inorganic sulfide compound.

Combining an inorganic halide compound or inorganic sulfide compound and a sorbent with the liquid as in (c) above can be done by combining the inorganic halide compound or inorganic sulfide compound and the sorbent with the bulk liquid, or by combining the inorganic halide compound or inorganic sulfide compound and/or sorbent with a portion of the liquid to form a slurry, and then combining the slurry with the remaining liquid.

Some substances are combinations of at least one solid and at least one liquid, and include sludge, slurries, sediments, pore water (e.g., soil pore water or sediment pore water) and other combinations of solids and liquids. Sediment, soil pore water, and sediment pore water are preferred combination substances to treat in the practice of this invention. These combinations are sometimes referred to as multiphasic substances. Processes of the invention are provided for reducing environmental availability of at least a portion of one or more environmental pollutants in a combination comprising one or more environmental pollutants. Substances which are combinations are sometimes referred to herein as combination substances.

The adding and/or applying of an inorganic halide compound or inorganic sulfide compound and a sorbent to the combination can comprise:
- (a) injecting an inorganic halide compound or inorganic sulfide compound and a sorbent into the combination, optionally through holes and/or wells and/or channels that are present in the substance, whether already present or manually created, e.g., by drilling into the combination; and/or
- (b) applying an inorganic halide compound or inorganic sulfide compound and a sorbent to a surface of the combination; and/or
- (c) combining an inorganic halide compound or inorganic sulfide compound and a sorbent with at least a portion of a surface of the combination as described above for solid and/or liquid substances; and/or
- (d) combining an inorganic halide compound or inorganic sulfide compound and a sorbent with the combination; and/or
- (e) adding an inorganic halide compound or inorganic sulfide compound and a sorbent to a contained combination; and/or
- (f) covering a surface of the substance with a layer comprising an inorganic halide compound or inorganic sulfide compound and a sorbent; and/or
- (g) placing an inorganic halide compound or inorganic sulfide compound and a sorbent into a cap; and/or
- (h) adding an inorganic halide compound or inorganic sulfide compound and a sorbent to a reactive barrier; and/or
- (i) forming a reactive barrier containing an inorganic halide compound or inorganic sulfide compound and a sorbent; and/or
- (j) placing the an inorganic halide compound or inorganic sulfide compound and a sorbent within a geotextile mat; and/or
- (k) placing an inorganic halide compound or inorganic sulfide compound and a sorbent in a vacuum well in which the combination is treated, in a manner similar to that described for solid substances.

Some preferred methods for adding and/or applying an inorganic halide compound or inorganic sulfide compound and a sorbent to the combination are:
- (a) injecting an inorganic halide compound or inorganic sulfide compound and a sorbent into the combination, optionally through holes and/or wells and/or channels that are present in the substance, whether already present or manually created, e.g., by drilling into the combination; and/or
- (b) applying an inorganic halide compound or inorganic sulfide compound and a sorbent to a surface of the combination; and/or
- (c) combining an inorganic halide compound or inorganic sulfide compound and a sorbent with at least a portion of a surface of the combination as described above for solid and/or liquid substances; and/or
- (d) combining an inorganic halide compound or inorganic sulfide compound and a sorbent with the combination; and/or
- (e) adding an inorganic halide compound or inorganic sulfide compound and a sorbent to a contained combination; and/or
- (f) covering a surface of the substance with a layer comprising an inorganic halide compound or inorganic sulfide compound and a sorbent; and/or
- (g) placing an inorganic halide compound or inorganic sulfide compound and a sorbent into a cap; and/or
- (h) adding an inorganic halide compound or inorganic sulfide compound and a sorbent to a reactive barrier; and/or
- (i) forming a reactive barrier containing an inorganic halide compound or inorganic sulfide compound and a sorbent; and/or
- (j) placing the an inorganic halide compound or inorganic sulfide compound and a sorbent within a geotextile mat.

More preferred methods for adding and/or applying an inorganic halide compound or inorganic sulfide compound and a sorbent to the combination are:
(a) injecting an inorganic halide compound or inorganic sulfide compound and a sorbent into the combination;
(b) applying an inorganic halide compound or inorganic sulfide compound and a sorbent to a surface of the combination;
(c) combining an inorganic halide compound or inorganic sulfide compound and a sorbent with at least a portion of a surface of the combination; and/or
(d) combining an inorganic halide compound or inorganic sulfide compound and a sorbent with the combination.

Combining the inorganic halide compound or inorganic sulfide compound and the sorbent with the combination as in (d) above can be done by combining the inorganic halide compound or inorganic sulfide compound and sorbent with the combination, or by combining the inorganic halide compound or inorganic sulfide compound and/or sorbent with a portion of the combination to form a mixture, and then combining the mixture with the surface of the combination. In these embodiments, the inorganic halide compound and the sorbent can comprise, for example, without limitation, an inorganic chloride or inorganic bromide and an activated carbon, preferably an inorganic bromide and a carbonaceous material, more preferably sodium bromide and/or calcium bromide and an activated carbon.

Another embodiment of this invention is a process for reducing environmental availability of at least a portion of one or more environmental pollutants in a substance comprising one or more environmental pollutants and bromide ions. The process comprises adding and/or applying a bromine-containing carbonaceous material to said substance, thereby reducing environmental availability of at least a portion of one or more environmental pollutants in the substance. In this embodiment, an inorganic halide compound does not need to be added or applied because bromide ions are present in the substance with the environmental pollutant(s); the remediation agents in this embodiment of the invention comprise a bromine-containing carbonaceous material. In preferred embodiments, the amount of bromine in the bromine-containing carbonaceous material is in the range of about 0.1 wt % to about 20 wt %, based on the total weight of the bromine-containing carbonaceous material. A feature of this embodiment is that adding and/or applying only the bromine-containing carbonaceous material is necessary, and the treatments of the substance and considerations therefor are the same as described above in regard to the sorbent. In this embodiment, applying an inorganic halide compound or an inorganic sulfide compound is optional.

The adding and/or applying of a bromine-containing carbonaceous material to the solid containing one or more environmental pollutants and bromide ions can comprise:
(a) injecting a bromine-containing carbonaceous material into the solid;
(b) applying a bromine-containing carbonaceous material to a surface of the solid;
(c) combining a bromine-containing carbonaceous material with at least a portion of a surface of the solid;
(d) adding a bromine-containing carbonaceous material to a contained solid;
(e) combining a bromine-containing carbonaceous material with the solid;
(f) adding a bromine-containing carbonaceous material to a reactive barrier;
(g) forming a reactive barrier containing a bromine-containing carbonaceous material; and/or
(h) placing a bromine-containing carbonaceous material in a vacuum well in which the solid is treated.

Some preferred methods for adding and/or applying a bromine-containing carbonaceous material to the solid are:
(a) injecting a bromine-containing carbonaceous material into the solid;
(b) applying a bromine-containing carbonaceous material to a surface of the solid;
(c) combining a bromine-containing carbonaceous material with at least a portion of a surface of the solid;
(d) adding a bromine-containing carbonaceous material to a contained solid;
(e) combining a bromine-containing carbonaceous material with the solid;
(f) adding a bromine-containing carbonaceous material to a reactive barrier; and/or
(g) forming a reactive barrier containing a bromine-containing carbonaceous material.

More preferred methods for adding and/or applying a bromine-containing carbonaceous material to the solid are:
(a) injecting a bromine-containing carbonaceous material into the solid;
(b) applying a bromine-containing carbonaceous material to a surface of the solid; and/or
(c) combining a bromine-containing carbonaceous material with at least a portion of a surface of the solid.

Combining a bromine-containing carbonaceous material with the surface of the solid as in (c) above can be done by combining the bromine-containing carbonaceous material with a portion of the solid, and then applying the mixture of the bromine-containing carbonaceous material and portion of the solid to the surface of the solid, or by combining the bromine-containing carbonaceous material with the surface of the solid.

An embodiment of treatment of solids to reduce environmental availability of one or more environmental pollutants involves (i) drilling holes, wells, and/or channels into the solid, (ii) covering a surface of the solid with a layer of bromine-containing carbonaceous material, and (iii) heating some parts of the solid to migrate one or more environmental pollutants, e.g., mercury, toward the surface which has a bromine-containing carbonaceous material thereon.

Another embodiment of treatment of solids to reduce environmental availability of one or more environmental pollutants involves (i) drilling holes, wells, and/or channels into the solid, (ii) filling some holes or channels with a bromine-containing carbonaceous material, and (iii) purging heated air into holes or channels to migrate one or more environmental pollutants, e.g., mercury, toward the holes filled with the bromine-containing carbonaceous material.

In another embodiment of this invention in which bromine-containing carbonaceous materials are remediation agents for mercury contaminated soil, the bromine-containing carbonaceous material is spread on top of the contaminated soil. In this method, the soil is not disturbed and the bromine-containing carbonaceous material is present in the top layer of soil and blocks migration of mercury from the soil.

The adding and/or applying of a bromine-containing carbonaceous material to the liquid containing one or more environmental pollutants and bromide ions can comprise:
(a) injecting a bromine-containing carbonaceous material into the liquid;
(b) applying a bromine-containing carbonaceous material to the surface of the liquid;

(c) combining a bromine-containing carbonaceous material with the liquid;
(d) passing the liquid over a fixed bed comprising a bromine-containing carbonaceous material;
(e) passing the liquid through a filter comprising a bromine-containing carbonaceous material;
(f) adding a bromine-containing carbonaceous material to a contained volume of liquid; and/or
(g) pumping the liquid through a fixed bed or column containing a bromine-containing carbonaceous material.

Combining a bromine-containing carbonaceous material with the liquid as in (c) above can be done by combining the bromine-containing carbonaceous material with the bulk liquid, or by combining the bromine-containing carbonaceous material with a portion of the liquid to form a slurry, and then combining the slurry with the remaining liquid.

The adding and/or applying of a bromine-containing carbonaceous material to the combination containing one or more environmental pollutants and bromide ions can comprise:
(a) injecting a bromine-containing carbonaceous material into the combination;
(b) applying a bromine-containing carbonaceous material to a surface of the combination;
(c) combining a bromine-containing carbonaceous material with at least a portion of a surface of the combination;
(d) combining a bromine-containing carbonaceous material with the combination;
(e) adding a bromine-containing carbonaceous material to a contained combination;
(f) covering a surface of the substance with a layer comprising a bromine-containing carbonaceous material;
(g) placing a bromine-containing carbonaceous material into a cap;
(h) adding a bromine-containing carbonaceous material to a reactive barrier;
(i) forming a reactive barrier containing a bromine-containing carbonaceous material;
(j) placing a bromine-containing carbonaceous material within a geotextile mat; and/or
(k) placing a bromine-containing carbonaceous material in a vacuum well in which the combination is treated.

Some preferred methods for adding and/or applying a bromine-containing carbonaceous material to the combination are:
(a) injecting a bromine-containing carbonaceous material into the combination;
(b) applying a bromine-containing carbonaceous material to a surface of the combination;
(c) combining a bromine-containing carbonaceous material with at least a portion of a surface of the combination;
(d) combining a bromine-containing carbonaceous material with the combination;
(e) adding a bromine-containing carbonaceous material to a contained combination;
(f) covering a surface of the substance with a layer comprising a bromine-containing carbonaceous material;
(g) placing a bromine-containing carbonaceous material into a cap;
(h) adding a bromine-containing carbonaceous material to a reactive barrier;
(i) forming a reactive barrier containing a bromine-containing carbonaceous material; and/or
(j) placing a bromine-containing carbonaceous material within a geotextile mat.

More preferred methods for adding and/or applying a bromine-containing carbonaceous material to the combination are:
(a) injecting a bromine-containing carbonaceous material into the combination;
(b) applying a bromine-containing carbonaceous material to a surface of the combination;
(c) combining a bromine-containing carbonaceous material with at least a portion of a surface of the combination; and/or
(d) combining a bromine-containing carbonaceous material with the combination.

Combining the bromine-containing carbonaceous material with the combination as in (d) above can be done by combining the bromine-containing carbonaceous material with the combination, or by combining the bromine-containing carbonaceous material with a portion of the combination to form a mixture, and then combining the mixture with the surface of the combination. In these embodiments, the bromine-containing carbonaceous material can be a bromine-containing activated carbon.

As will be clear to those skilled in the art, depending upon the substance treated, numerous variables regarding use of this invention must be considered. In all of the processes of this invention, whether applied to solids, liquids, or combinations thereof, given the teachings herein, those skilled in the art have at hand the knowledge to determine amounts of inorganic halide compound or inorganic sulfide compound and sorbent to use; whether to use optional components in combination with the inorganic halide compound or inorganic sulfide compound and sorbent, and, if so, the specific optional components and amounts thereof that will be beneficial; the number of applications of processes of this invention, and the period of time between such applications, that will be beneficial; whether to use processes of this invention in conjunction with known remediation methods, and, if so, how to do so to obtain beneficial results, etc.

The following examples are presented for purposes of illustration, and are not intended to impose limitations on the scope of this invention.

In the Examples, unless otherwise specified, the amount of mercury present in a sample was determined in an atomic absorption spectrometer with a mercury vapor analyzer via cold vapor atomic absorption (CVAA; Atomic Absorption Mercury Spectrometer with Zeeman background correction, Ohio Lumex Co., model no. RA 915+).

In all of the Examples, runs using activated carbon by itself are comparative. Except as otherwise noted, the powdered activated carbon used in the Examples was prepared from coconut shells.

Example 1

Powdered activated carbon (PAC) was added to several reactor bottles, followed by 50 mL of a solution of mercury, which solution had a pH of 2, and contained about 50 ppm mercury from $Hg(NO_3)_2$; the amount of PAC in each reactor bottle was 0.4 g/L. Solid NaBr was dissolved in deionized water to form a solution containing bromide ion at 2 wt %; an amount of the NaBr solution was pipetted into each reactor bottle.

The samples were rotated for 24 hours at 30 rpm, and each of the resulting mixtures was passed through a syringe filter (0.45 μm pore membrane) to separate the solids from the liquid. Another run was conducted in parallel using activated carbon without bromide solution for comparison. The mercury concentration of the filtered liquid from each solution was then determined. Results are summarized in Table 1.

In these experiments, the activated carbon capacity was 100 mg Hg/g activated carbon (sorbent) at a steady state concentration of bromide ion of about 16 ppm, significantly larger than the mercury adsorption of activated carbon without bromide ion present.

The FIGURE is a graph showing mercury adsorption as a function of bromide ion concentration, where the x axis is the bromide ion concentration in mg/L, and the y axis is the Hg adsorbed in mg/g sorbent.

TABLE 1

| Sorbent and salt | Bromide ion conc., mg/L | Sorbent conc., mg/L | Hg concentration Initial, mg/L | Hg concentration Aq. equil. conc., mg/L | Hg, mg/g sorbent | Hg removed |
|---|---|---|---|---|---|---|
| PAC | 0 | 406 | 49.2 | 37.7 | 28.3 | 23% |
| PAC and NaBr | 4 | 412 | 49.2 | 22.3 | 65.2 | 55% |
|  | 16 | 404 | 49.2 | 9.7 | 97.7 | 80% |
|  | 20 | 408 | 49.2 | 8.2 | 100.4 | 83% |
|  | 32 | 418 | 49.2 | 6.7 | 101.6 | 86% |
|  | 40 | 402 | 49.2 | 4.8 | 110.4 | 90% |

Example 2

More samples prepared as in Example 1 were prepared and tested; one set of runs used powdered activated carbon formed from palm shells. Results are summarized in Table 2.

TABLE 2

| Sorbent and salt | Bromide ion, wt %[1] | Sorbent conc., mg/L | Hg concentration Initial, mg/L | Hg concentration Aq. equil. conc., mg/L | Hg, mg/g sorbent | Hg removed |
|---|---|---|---|---|---|---|
| PAC | 0 | 406 | 49.2 | 37.7 | 28.3 | 23% |
| PAC and NaBr | 8 | 418 | 49.2 | 6.7 | 101.6 | 86% |
| PAC and MnBr$_2$ | 8 | 406 | 47.6 | 3.7 | 108 | 92% |
| PAC[2] | 0 | 406 | 45.5 | 35.7 | 24 | 21% |
| PAC[2] and NaBr | 8 | 408 | 45.5 | 14.6 | 75.6 | 68% |

[1]Relative to the total weight of bromide ion and activated carbon.
[2]This PAC was formed from palm shells.

Example 3

More samples prepared as in Example 1 were prepared and tested. In these runs, the initial mercury concentration was varied. Results are summarized in Table 3.

TABLE 3

| Sorbent and salt | Bromide ion conc., mg/L | Sorbent conc., mg/L | Hg concentration Initial, mg/L | Hg concentration Aq. equil. conc., mg/L | Hg, mg/g sorbent | Hg removed |
|---|---|---|---|---|---|---|
| PAC and NaBr | 40 | 404 | 1 | 0 | 2.2 | 100% |
|  | 40 | 410 | 35 | 1.7 | 91.83 | 96% |
|  | 40 | 408 | 65 | 7.7 | 140.34 | 88% |

Example 4

Samples prepared as in Example 1 were prepared and tested, using NaCl, NaI, and Na$_2$S as well as NaBr. Results are summarized in Table 4.

TABLE 4

| Sorbent and salt | Counterion conc., wt %[1] | Counterion conc., as Br⁻, wt % | Sorbent conc., g/L | Hg concentration Initial, g/L | Hg concentration Aq. equil. conc., g/L | Hg, mg/g sorbent | Hg removed |
|---|---|---|---|---|---|---|---|
| PAC | 0 | 0 | 406 | 49.2 | 37.7 | 28.3 | 23% |
| PAC and NaBr | 8 | 8 | 418 | 49.2 | 6.7 | 101.6 | 86% |
| PAC and NaCl | 8 | 18 | 410 | 47.7 | 37.3 | 97.7 | 22% |
| PAC and NaI | 8 | 5 | 414 | 47.7 | 17.0 | 100.4 | 64% |
| PAC and Na₂S | 8 | 20 | 414 | 47.7 | 0 | 101.6 | 100% |

[1]Relative to the total weight of counterion and activated carbon; counterions are bromide for NaBr; chloride for NaCl; iodide for NaI; and sulfide for Na₂S. Amounts of the counterions listed in this column are reported as the particular counterion.

Example 5

Samples were prepared and tested using NaBr. Powdered activated carbon (PAC) was added at a loading of 1 wt % to sand, and packed into several columns for testing. To each column, 50 mL of a solution of mercury, which solution had a pH of 2, and contained 50 ppm mercury from $Hg(NO_3)_2$ was added. Solid NaBr was dissolved in deionized water to form a solution containing bromide ion at amounts so that the molar ratio of bromide ion to mercury ranged from 1:1 to 4:1; a comparative sample that did not contain bromide ions was also tested. The NaBr solutions were each added to a column to extract mercury. The mercury concentration of the effluent liquid from each column was then determined. Results are summarized in Table 5.

TABLE 5

| Sorbent and salt | | Hg removed | | | | |
|---|---|---|---|---|---|---|
| Bed volume | Br⁻:Hg | 50 | 100 | 150 | 200 | 250 |
| PAC | 0 | 0% | 0% | 0% | 0% | 0% |
| PAC and NaBr | 1:1 | 95% | 75% | | | |
| PAC and NaBr | 2:1 | 95% | 95% | 95% | 90% | |
| PAC and NaBr | 3:1 | 95% | 95% | 95% | 95% | 95% |
| PAC and NaBr | 4:1 | 95% | 95% | 95% | 95% | 95% |

Example 6

Several soil samples were prepared and tested. Powdered activated carbon (PAC) was added at 1 wt % to some of the soil samples, and solid NaBr was dissolved in deionized water to form a solution containing 40 ppm NaBr, which was added to some of the soil samples. To each soil sample was added a solution of either $HgCl_2$ or $Hg(NO_3)_2$ to provide 50 ppm Hg in each sample. Solutions at two different pH values were used. The samples were rotated for 24 hours at 30 rpm, and each of the resulting mixtures was passed through a syringe filter (0.45 μm pore membrane) to separate the solids from the liquid. A run was conducted in parallel using soil without PAC or bromide solution for comparison. All of the runs except the one containing both PAC and NaBr are comparative. The mercury concentration of the filtered liquid from each solution was then determined. Results are summarized in Table 6.

TABLE 6

| | Hg removed | | | |
|---|---|---|---|---|
| | Hg source | | | |
| | HgCl₂ | HgCl₂ | Hg(NO₃)₂ | Hg(NO₃)₂ |
| | | | pH | |
| | 2.01 | 6.26 | 2.01 | 6.03 |
| Soil | 4.67% | 73.27% | 5.72% | 94.09% |
| Soil + 40 ppm NaBr | 1.40% | 56.26% | −0.61% | 75.71% |
| Soil + 1 wt % PAC | 84.21% | 97.25% | 62.55% | 97.82% |
| Soil + 1 wt % PAC + 40 ppm NaBr | 96.50% | 98.90% | 91.08% | 99.43% |

Example 7

Several wastewater samples containing mercury were treated with combinations of bromide ion and activated carbon. Solid NaBr was dissolved in deionized water to form a sodium bromide solution, which was added to the wastewater samples. Two samples were treated by a batch method, which involved adding some of the sodium bromide solution, then some powdered activated carbon, and shaking the sample several times, after which each of the resulting mixtures was passed through a syringe filter (0.45 μm pore membrane) to separate the solids from the liquid, and the mercury concentration of the filtered liquid from each solution was then determined. One sample was subjected to a column treatment, in which the wastewater sample was pumped though a bed of granulated activated carbon (GAC), after which the effluent water was analyzed. Results are summarized in Table 7.

TABLE 7

| Sorbent and salt | Bromide ion, mg/L | Initial Hg, mg/L | pH | Treatment | Post-treatment Hg, mg/L | Hg removed |
|---|---|---|---|---|---|---|
| PAC[1] and NaBr | 112 | 0.024 | 2.64 | batch | 0.000307 | 98.74% |
| PAC[2] and NaBr | 166 | 0.208 | 2.56 | batch | 0.0006 | 99.71% |
| GAC[3] and NaBr | 50 | 53.000 | 5.00 | column | 0.000006 | 100.00% |

[1]PAC was used in an amount of 0.15 g/L.
[2]PAC was used in an amount of 0.2 g/L.
[3]Granulated activated carbon.

Further embodiments of the invention include, without limitation:

A) A process for reducing environmental availability of at least a portion of one or more environmental pollutants in a substance comprising one or more environmental pollutants, which process comprises adding and/or applying an inorganic halide compound or inorganic sulfide compound to said substance, wherein the inorganic halide compound is sodium bromide or calcium bromide and wherein the inorganic sulfide compound is hydrogen sulfide or sodium sulfide, and adding and/or applying a sorbent to said substance wherein the sorbent is an activated carbon or a bromine-containing carbonaceous material, thereby reducing environmental availability of at least a portion of one or more environmental pollutants in the substance.

B) A process according as in A) wherein the inorganic halide compound or inorganic sulfide compound is in a solution, and is in an amount such that the halide or sulfide is about 0.5 wt % to about 45 wt % calculated as bromide relative to the total weight of the solution.

C) A process according as in A) wherein inorganic halide compound or inorganic sulfide compound is in a solution, and is in an amount such that the halide or sulfide is about 1 wt % to about 30 wt % calculated as bromide relative to the total weight of the solution.

D) A process according as in A) wherein the inorganic halide compound or inorganic sulfide compound is in a solution, and is in an amount such that the halide or sulfide is about 5 wt % to about 20 wt % calculated as bromide relative to the total weight of the solution.

E) A process as in any of A)-D) wherein the substance is soil.

F) A process as in any of A)-D) wherein the substance is sediment.

G) A process as in any of A)-D) wherein the substance is soil pore water or sediment pore water.

H) A process as in A) wherein the inorganic halide compound is sodium bromide, and the sorbent is an activated carbon, wherein the inorganic halide compound is in a solution, and is in an amount such that the halide is about 0.5 wt % to about 45 wt % calculated as bromide relative to the total weight of the solution, and wherein the substance is soil, sediment, soil pore water, or sediment pore water.

I) A process as in H) wherein the inorganic halide compound or inorganic sulfide compound is in an amount such that the halide is about 1 wt % to about 30 wt %, preferably about 5 wt % to about 20 wt %, calculated as bromide relative to the total weight of the solution.

J) A process as in A) wherein the inorganic sulfide compound is sodium sulfide, and the sorbent is an activated carbon, wherein the inorganic sulfide compound is in a solution, and is in an amount such that the sulfide is about 0.5 wt % to about 45 wt % calculated as bromide relative to the total weight of the solution, and wherein the substance is soil, sediment, soil pore water, or sediment pore water.

K) A process as in J) wherein inorganic sulfide compound is in an amount such that the sulfide is about 1 wt % to about 30 wt %, preferably about 5 wt % to about 20 wt %, calculated as bromide relative to the total weight of the solution.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers.

Rather, the article "a" or "an" if and as used herein is intended to cover one or more such elements, unless the text expressly indicates otherwise.

While the present invention has been described in terms of one or more preferred embodiments, it is to be understood that other modifications may be made without departing from the scope of the invention, which is set forth in the claims below.

The invention claimed is:

1. A process for reducing environmental availability of at least a portion of one or more environmental pollutants in a substance comprising one or more environmental pollutants, which process comprises
    adding and/or applying an inorganic halide compound or an inorganic sulfide compound to said substance, wherein the inorganic halide compound comprises one or more inorganic fluorides, inorganic chlorides, inorganic bromides, and/or inorganic iodides, and
    adding and/or applying a sorbent to said substance, wherein a substrate material of the sorbent is a bromine-containing carbonaceous material, and wherein the inorganic halide compound or inorganic sulfide compound and sorbent are not mixed or combined prior to application to the substance and an amount of the sorbent relative to the inorganic halide compound or inorganic sulfide compound is between 0.01 wt % and 0.1 wt %,
    thereby reducing environmental availability of at least a portion of one or more environmental pollutants in the substance,
    wherein the substance comprising the environmental pollutants is a solid, a liquid, or a combination of at least one solid and at least one liquid.

2. A process according to claim 1 wherein the carbonaceous material is activated carbon.

3. A process according to claim 1 wherein sorbent comprises an inorganic material, and wherein the inorganic material is selected from inorganic oxides, natural zeolites, inorganic carbonates, and clay minerals.

4. A process according to claim 1 wherein sorbent comprises an inorganic material,
    and wherein the inorganic material is selected from chabazite, silica, calcium carbonate, kaolinite, and bentonite.

5. A process according to claim 1 wherein the inorganic halide compound is an inorganic chloride or an inorganic bromide or wherein the inorganic sulfide compound is an alkali metal sulfide or an alkaline earth sulfide.

6. A process according to claim 1 wherein the inorganic halide compound is an inorganic bromide and the sorbent is an activated carbon, or wherein the inorganic sulfide compound is an alkali metal sulfide and the sorbent is an activated carbon.

7. A process according to claim 6 wherein the inorganic halide compound is sodium bromide or calcium bromide, or wherein the inorganic sulfide compound is sodium sulfide.

8. A process according to claim 1 wherein the inorganic halide compound is in a solution, and is in an amount such that the halide is about 0.5 wt % to about 45 wt % calculated as bromide relative to the total weight of the solution.

9. A process according to claim 1 wherein the substance comprising said environmental pollutants is a solid, wherein adding and/or applying the inorganic halide compound or inorganic sulfide compound and the sorbent to the solid comprises:
    (a) injecting an inorganic halide compound or inorganic sulfide compound and a sorbent into the solid;
    (b) applying an inorganic halide compound or inorganic sulfide compound and a sorbent to a surface of the solid;
    (c) combining an inorganic halide compound or inorganic sulfide compound and a sorbent with at least a portion of a surface of the solid;
    (d) adding an inorganic halide compound or inorganic sulfide compound and a sorbent to a contained solid;
    (e) combining an inorganic halide compound or inorganic sulfide compound and a sorbent with the solid;
    (f) adding an inorganic halide compound or inorganic sulfide compound and a sorbent to a reactive barrier;
    (g) forming a reactive barrier containing an inorganic halide compound or inorganic sulfide compound and a sorbent; and/or
    (h) placing an inorganic halide compound or inorganic sulfide compound and a sorbent in a vacuum well in which the solid is treated.

10. A process according to claim 1 wherein the substance comprising said environmental pollutants is a liquid, wherein adding and/or applying the inorganic halide compound or inorganic sulfide compound and the sorbent to the liquid comprises:
    (a) injecting an inorganic halide compound or inorganic sulfide compound and a sorbent into the liquid;
    (b) applying an inorganic halide compound or inorganic sulfide compound and a sorbent to the surface of the liquid;
    (c) combining an inorganic halide compound or inorganic sulfide compound and a sorbent with the liquid;
    (d) passing the liquid over a fixed bed comprising an inorganic halide compound or inorganic sulfide compound and a sorbent;
    (e) passing the liquid through a filter comprising an inorganic halide compound or inorganic sulfide compound and a sorbent;
    (f) adding an inorganic halide compound or inorganic sulfide compound and a sorbent to a contained volume of liquid; and/or
    (g) contacting the liquid and an inorganic halide compound or inorganic sulfide compound, and pumping the liquid through a fixed bed or column containing a sorbent during or after the contacting with the inorganic halide compound or inorganic sulfide compound.

11. A process according to claim 1 wherein the substance comprising said environmental pollutants is a combination of at least one solid and at least one liquid, wherein adding and/or applying the inorganic halide compound or inorganic sulfide compound and the sorbent to the combination comprises:
    (a) injecting an inorganic halide compound or inorganic sulfide compound and a sorbent into the combination;
    (b) applying an inorganic halide compound or inorganic sulfide compound and a sorbent to a surface of the combination;
    (c) combining an inorganic halide compound or inorganic sulfide compound and a sorbent with at least a portion of a surface of the combination;
    (d) combining an inorganic halide compound or inorganic sulfide compound and a sorbent with the combination;
    (e) adding an inorganic halide compound or inorganic sulfide compound and a sorbent to a contained combination;
    (f) covering a surface of the substance with a layer comprising an inorganic halide compound and a sorbent or an inorganic sulfide compound and a sorbent;

(g) placing an inorganic halide compound or an inorganic sulfide compound and a sorbent into a cap;
(h) adding an inorganic halide compound or inorganic sulfide compound and a sorbent to a reactive barrier;
(i) forming a reactive barrier containing an inorganic halide compound or inorganic sulfide compound and a sorbent;
(j) placing an inorganic halide compound or inorganic sulfide compound and a sorbent within a geotextile mat; and/or
(k) placing an inorganic halide compound or inorganic sulfide compound and a sorbent in a vacuum well in which the combination is treated.

12. A process according to claim 11 wherein the adding and/or applying comprises:
(a) injecting an inorganic halide compound or inorganic sulfide compound and a sorbent into the solid;
(b) applying an inorganic halide compound or inorganic sulfide compound and a sorbent to a surface of the solid; and/or (c) combining an inorganic halide compound or inorganic sulfide compound and a sorbent with at least a portion of a surface of the solid.

13. A process according to claim 11 wherein the combination is sediment, wherein the adding and/or applying comprises:
(a) injecting an inorganic halide compound or inorganic sulfide compound and a sorbent into the combination;
(b) applying an inorganic halide compound or inorganic sulfide compound and a sorbent to a surface of the combination;
(c) combining an inorganic halide compound or inorganic sulfide compound and a sorbent with at least a portion of a surface of the combination; and/or
(d) combining an inorganic halide compound or inorganic sulfide compound and a sorbent with the combination.

14. A process according to claim 1 wherein the substance is soil or sediment, and wherein the inorganic halide compound is sodium bromide or calcium bromide and the sorbent is an activated carbon, or the inorganic sulfide compound is hydrogen sulfide or sodium sulfide and the sorbent is an activated carbon.

* * * * *